(12) United States Patent
Gretz (10) Patent No.: US 9,887,524 B1
(45) Date of Patent: Feb. 6, 2018

(54) POST-INSTALLATION DEPTH-ADJUSTABLE ELECTRICAL BOX ASSEMBLY FOR CEILING FAN OR FIXTURE

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 40 days.

(21) Appl. No.: 15/142,397

(22) Filed: Apr. 29, 2016

Related U.S. Application Data

(60) Provisional application No. 62/156,538, filed on May 4, 2015.

(51) Int. Cl.
*H02G 3/08* (2006.01)
*F04D 25/08* (2006.01)
*F04D 29/64* (2006.01)
*H02G 3/14* (2006.01)

(52) U.S. Cl.
CPC .......... *H02G 3/081* (2013.01); *F04D 25/088* (2013.01); *F04D 29/646* (2013.01); *H02G 3/14* (2013.01)

(58) Field of Classification Search
CPC ............. H02G 3/08–3/088; H02G 3/02; F04D 25/088; F04D 29/646
USPC ........ 174/54, 53, 58, 61, 64; 220/4.01, 4.02, 220/3.2–3.9, 3.92, 3.94; 248/906, 121, 248/126, 200
See application file for complete search history.

(56) References Cited

U.S. PATENT DOCUMENTS

| 4,634,015 | A | 1/1987 | Taylor | |
|---|---|---|---|---|
| 5,289,935 | A | 3/1994 | Smith et al. | |
| 6,194,657 | B1 * | 2/2001 | Gretz | H02G 3/123 174/53 |
| 6,956,172 | B2 | 10/2005 | Dinh | |
| 7,312,395 | B1 * | 12/2007 | Gretz | H02G 3/123 174/53 |
| 7,476,807 | B1 | 1/2009 | Gretz | |
| 7,628,286 | B2 | 12/2009 | Lalancette | |
| 7,816,604 | B1 * | 10/2010 | Gretz | H01R 25/006 174/135 |
| 8,076,578 | B1 * | 12/2011 | Gretz | H02G 3/126 174/50 |
| 8,347,491 | B1 * | 1/2013 | Baldwin | H02G 3/123 174/50 |
| 8,704,107 | B2 * | 4/2014 | Laukhuf | H02G 3/126 174/520 |

(Continued)

*Primary Examiner* — Kareen Thomas (57) ABSTRACT

A depth-adjustable electrical box assembly for mounting of a fan or fixture on a ceiling including a fan/fixture box and a depth adjustment screw that is always accessible for adjusting the depth of the electrical box with respect to the ceiling. Bracket mounting screws are held captive with the assembly. A slide plate on the fan/fixture box is slideable with respect to the box. A base plate integral with the slide plate includes apertures therein for accepting the bracket mounting screws. A screw retainer, held securely to the fan/fixture box by a bracket, retains the end of the adjustment with respect to the box. Straps on the slide plate provide threaded engagement with the depth adjustment screw and enables the slide plate to slide with respect to the electrical box in response to rotation of the adjustment screw.

13 Claims, 14 Drawing Sheets

(56) References Cited

U.S. PATENT DOCUMENTS 8,785,774 B1    7/2014   Gretz

* cited by examiner

POST-INSTALLATION DEPTH-ADJUSTABLE ELECTRICAL BOX ASSEMBLY FOR CEILING FAN OR FIXTURE

CROSS-REFERENCE TO RELATED APPLICATIONS

This application claims priority to provisional U.S. application No. 62/156,538, filed May 4, 2015.

FIELD OF THE INVENTION

This invention relates to electrical boxes for mounting of fans and ceiling fixtures and specifically to an electrical box that allows depth adjustment of the box after the ceiling is in place.

BACKGROUND OF THE INVENTION

In the mounting of fans and ceiling fixtures it is typically desired to install the front face of the electrical box substantially flush with the ceiling. Conventional electrical boxes are typically fastened to a joist before the drywall is installed thereto. As drywall is supplied in various thicknesses or at times is doubled up to form a thicker ceiling, it is difficult for the installer to initially position the electrical box at the ideal level for the box to be flush with the eventual ceiling surface.

Although some adjustable electrical boxes have been proposed for adjusting the depth of a box at initial installation, there is no accommodation for later adjustment of the box after the initial installation. After initial installation of these prior art boxes, there is no mechanism to enable easy adjustment of the box with respect to the ceiling surface.

Accordingly, what is needed therefore is an adjustable electrical box that is capable of being securely fastened to a joist but which enables later adjustment of the depth of the box with respect to the ceiling surface.

BRIEF SUMMARY OF THE INVENTION

The invention is a post-installation depth-adjustable electrical box assembly for mounting of a fan or fixture on a ceiling. The electrical box assembly includes an electrical box or fan/fixture box and a depth adjustment screw that can be accessed at any time after the box is secured to a joist. The depth adjustment screw enables the rim of the box to be adjusted flush with the ceiling surface. Bracket mounting screws are held captive with the assembly. The fan/fixture box includes a bracket that can slide with respect to the box. The depth adjustment screw, accessible from the open face of the fan/fixture box, can be rotated to move the box with respect to a joist to which the fan/fixture box is secured thereby allowing adjustment of the fan/fixture box face so that it is flush with the ceiling surface. A slide plate includes an integral bracket with apertures therein for accepting the bracket mounting screws. A top bracket holds a screw retainer securely to the fan/fixture box and screw retainer retains the end of the adjustment with respect to the fan/fixture box. Straps on the slide plate provide threaded engagement with the depth adjustment screw and enables the slide plate to slide with respect to the fan/fixture box.

OBJECTS AND ADVANTAGES

A first object of the invention is to provide a depth-adjustable electrical box assembly for mounting of a fan or fixture on a ceiling.

A second object of the invention is to provide a depth-adjustable electrical box that may be adjusted after the box is mounted and the drywall has been installed.

A further object is to provide a depth-adjustable electrical box including a fan/fixture box and a slide plate that is slideable with respect to the box.

Another object is to provide a fan/fixture box and slide plate arrangement that is pre-set for ½" ceilings and for which the depth may be adjusted up to 1½".

A further object of the invention is to provide a depth-adjustable electrical box with a screw retainer means to retain the end of a depth-adjustment screw and thereby maintain its axis of rotation with respect to the electrical box.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
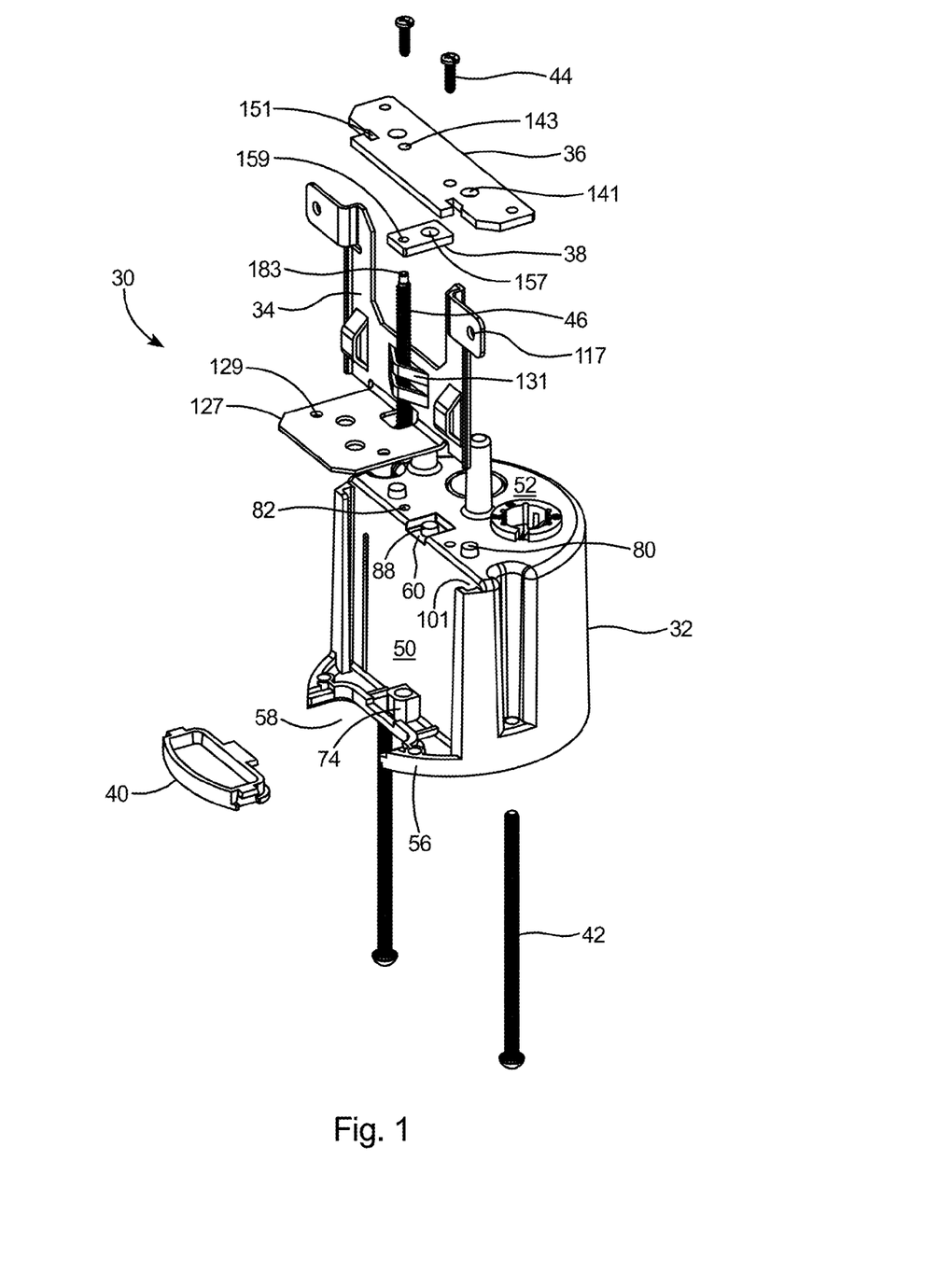
FIG. 1 is a front exploded isometric view of a first and preferred embodiment of a depth-adjustable electrical box, in accordance with embodiments of the invention.

With reference to FIG. 1, there is shown a preferred embodiment of a depth-adjustable electrical box assembly 30, in accordance with embodiments of the invention. The depth-adjustable electrical box assembly 30 is an assembly for mounting an electrical fan or electrical fixture, such as a light, to an overhead support (not shown) such as a rafter. The adjustable fan box 30 includes a fan/fixture box or electrical box 32, a slide plate 34, a bracket 36, a screw retaining tab 38, a box rim plate 40, one or more device mounting screws 42 for mounting a fan or fixture to the electrical box, bracket mounting screws 44, and an adjusting screw 46 for adjusting the position of the electrical box 32 with respect to the overhead support.

Figure 2:
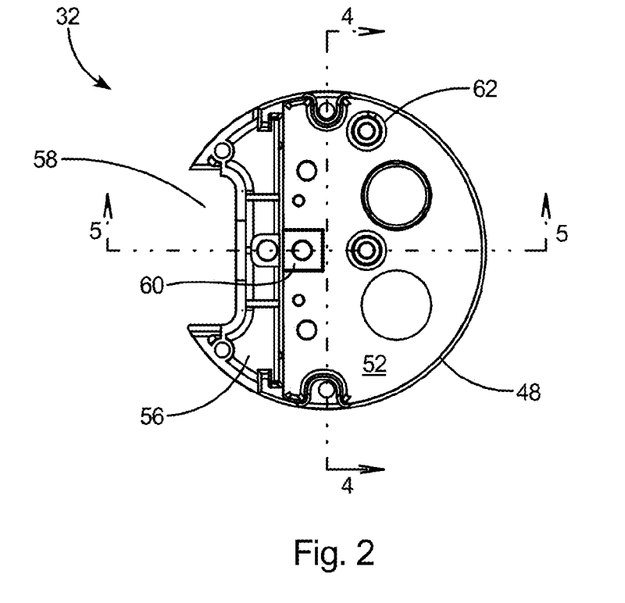
FIG. 2 is a top view of an electrical box that forms a portion of the adjustable fan box of FIG. 1.
Figure 3:
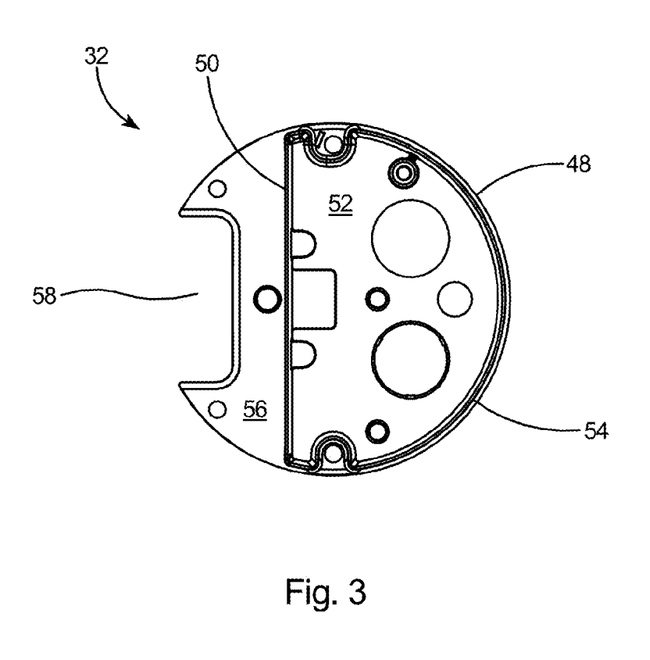
FIG. 3 is a bottom view of the electrical box.

Referring to FIGS. 2-3, the electrical box 32 includes an arcuate side wall 48, a flat side wall 50, a top wall 52, an arcuate bottom rim 54 on said arcuate side wall, and a sidewall extension 56 integral with and extending outward from the flat side wall 50. A notch 58 is provided in the sidewall extension 56 and a recessed area 60 is provided in the top wall 52. As shown in FIG. 2, mounting screw receptacles 62 extend from the top surface of the top wall 52.

Figure 4:
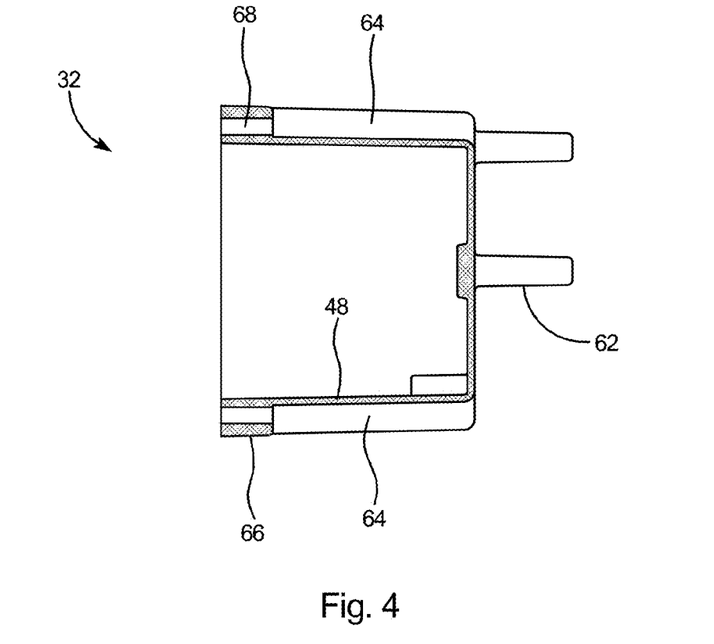
FIG. 4 is a sectional view of the electrical box taken along line 4-4 of FIG. 2.
Figure 5:
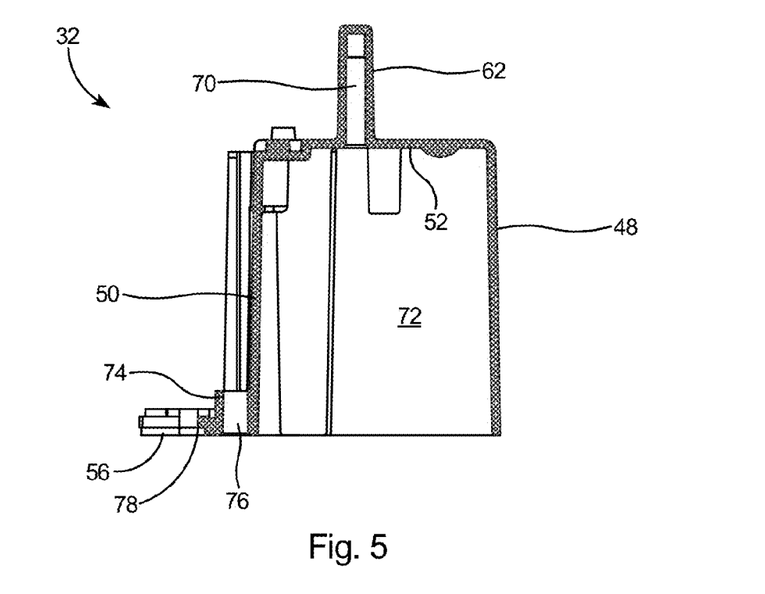
FIG. 5 is a sectional view of the electrical box taken along line 5-5 of FIG. 2.

Referring to FIGS. 4-5, the arcuate side wall 48 includes open channels 64 located 180 degrees apart on the electrical box. A box mounting boss 66 extends across each channel 64 and includes a box mounting bore 68 therein. Mounting screw receptacles 62 each include a bore 70 therein that is accessible from the inner enclosure 72 of the electrical box that is defined by the arcuate side wall 48, the flat side wall 50, and the top wall 52. Sidewall extension 56 includes a boss 74 having an aperture 76 therein and a ledge 78 extending outward from the boss 74.

Figure 6:
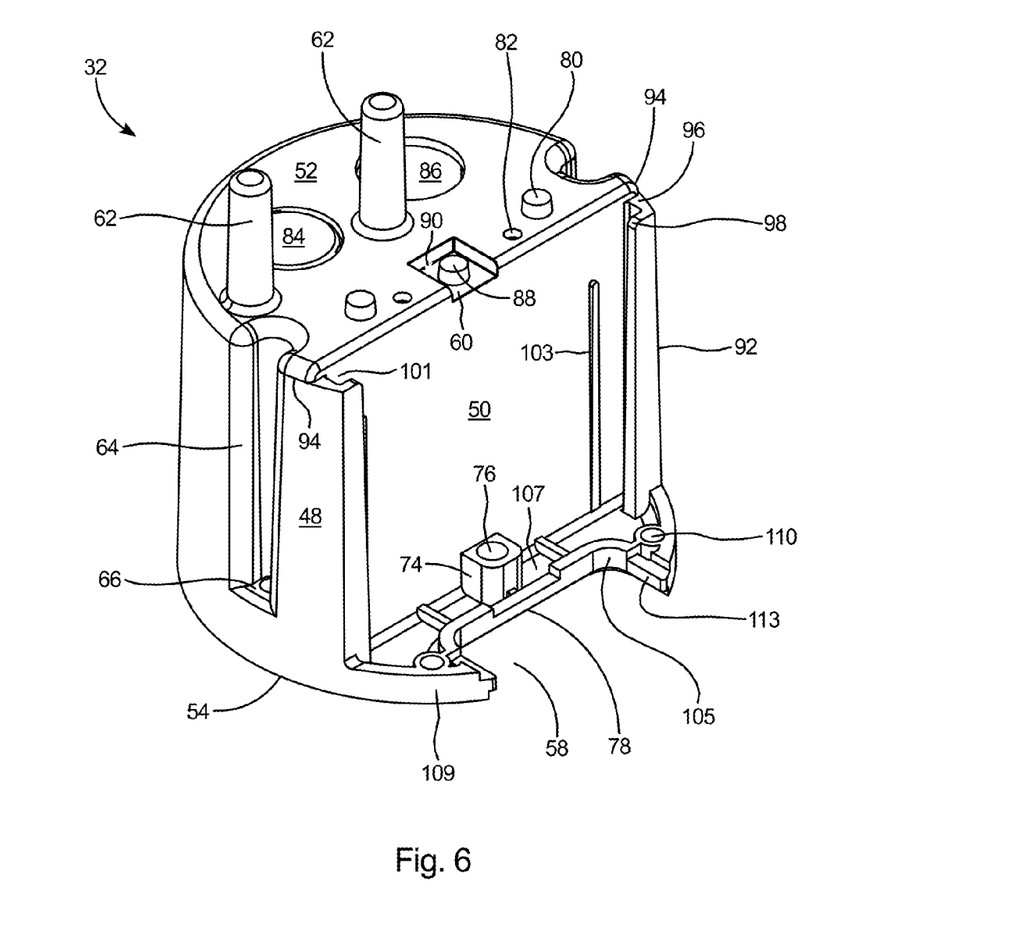
FIG. 6 is an isometric view of the electrical box.

With reference to FIG. 6, the electrical box further preferably includes two bracket alignment posts 80 extending from the top wall 52, apertures 82 inboard of the bracket alignment posts, and one or more knockout panels 84 that can be removed by an installer to create a knockout 86 for passage of electrical cables into the electrical box 32. A post 88 extends from the surface 90 surrounding the recess 60 in the top wall. The electrical box further includes two rails 92 at opposing edges 94 of the flat side wall 50. Rails 92 include a base portion 96 and an end portion 98 that define channels 101. Two ribs 103 extend from the flat wall 50 and are each located near one of the channels 101. Notch 58 of sidewall extension 56 includes a substantially U-shaped perimeter 105 and includes a base portion 107 and two outward extending wings 109. An aperture 110 is provided in each wing 109. One or more narrowed portions 113 are provided around the perimeter 105 of the notch 58.

Figure 7:
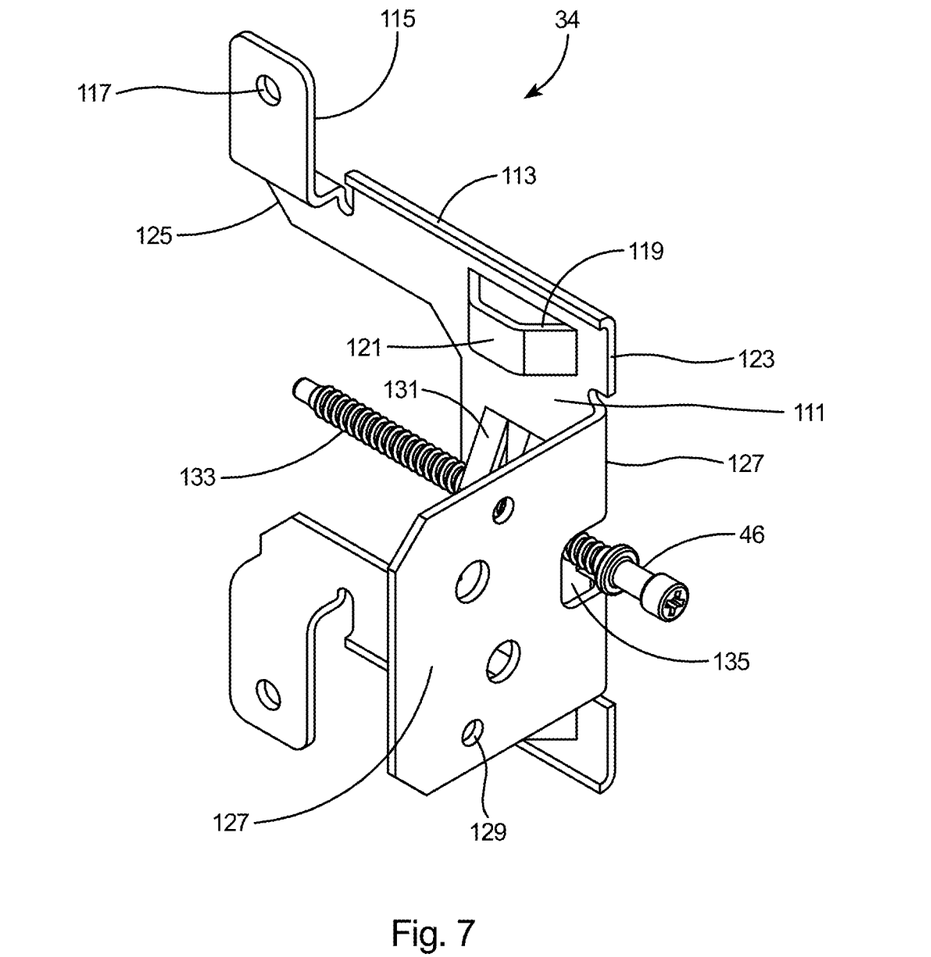
FIG. 7 is an isometric view of a slide plate that forms a portion of the adjustable fan box of FIG. 1.
Figure 8:
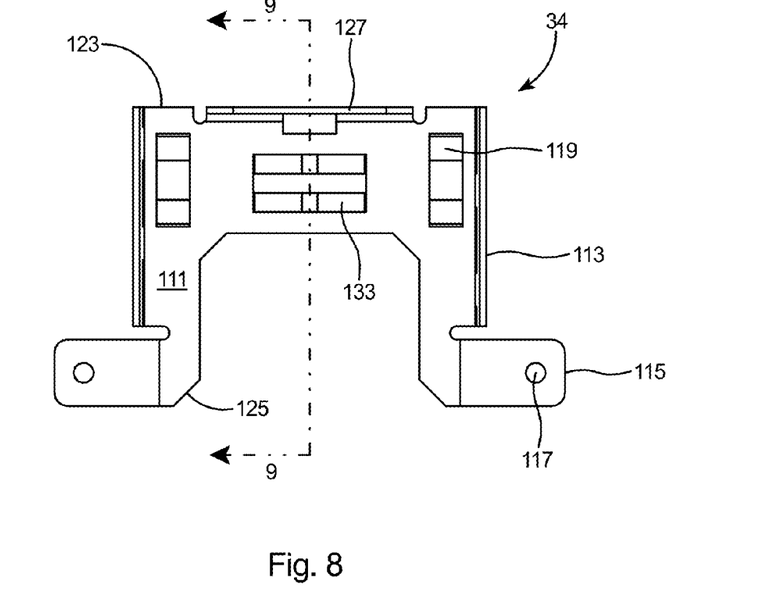
FIG. 8 is an elevation view of the slide plate.
Figure 9:
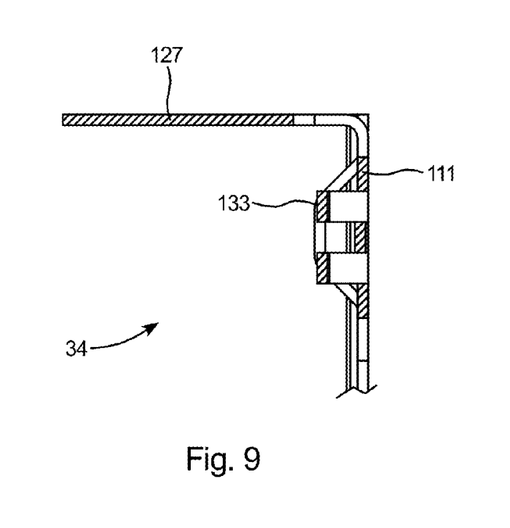
FIG. 9 is a sectional view of the slide plate taken along line 9-9 of FIG. 8.
Figure 10:
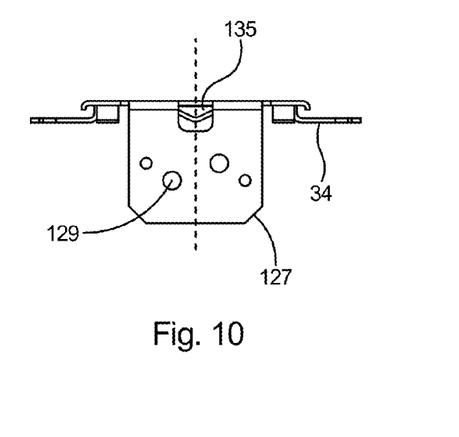
FIG. 10 is an end view of the slide plate as viewed from the top of FIG. 8.

Referring to FIG. 7, the slide plate 34 includes a base plate 111 including two outturned edges 113, two wings 115, and an aperture 117 in each wing. The wings 115 are laterally offset from the plane containing the base plate 111. Two ribs 119 extending from the base plate 111 each include an outer surface 121 that is offset from the base plate. The base plate 111 includes an inner edge 123 and an outer edge 125. A nailing flange 127 extends from the central portion of the base plate 111 at the inner edge 123. Nailing flange 127 includes one or more apertures 129 through which fasteners 130 are driven for securing the depth-adjustable electrical box assembly to a joist 132 (see FIG. 25). Two parallel outturned ribs 131 provide thread engagement surfaces for capturing and engaging threads 133 of adjusting screw 46.

Nailing flange 127 includes an opening 135 therein for enabling the passage of adjusting screw. Nailing flange 127 is preferably at a 90° angle with respect to the base plate 111.

Figure 11:
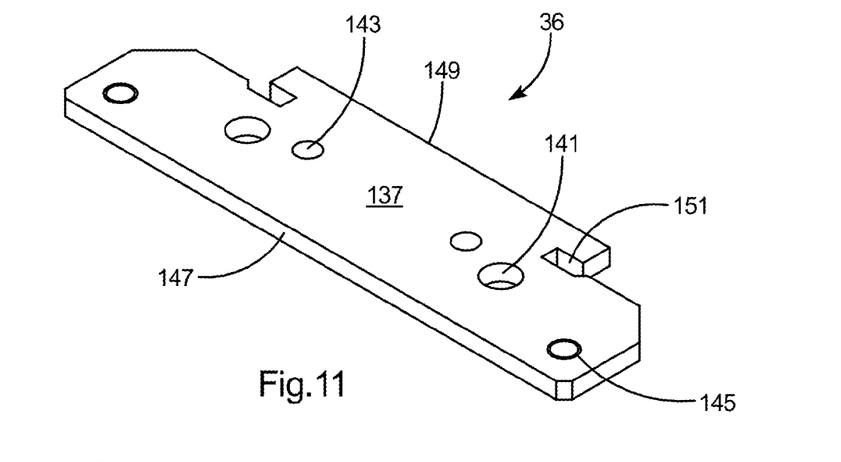
FIG. 11 is an isometric view of a bracket that forms a portion of the adjustable fan box of FIG. 1.
Figure 12:
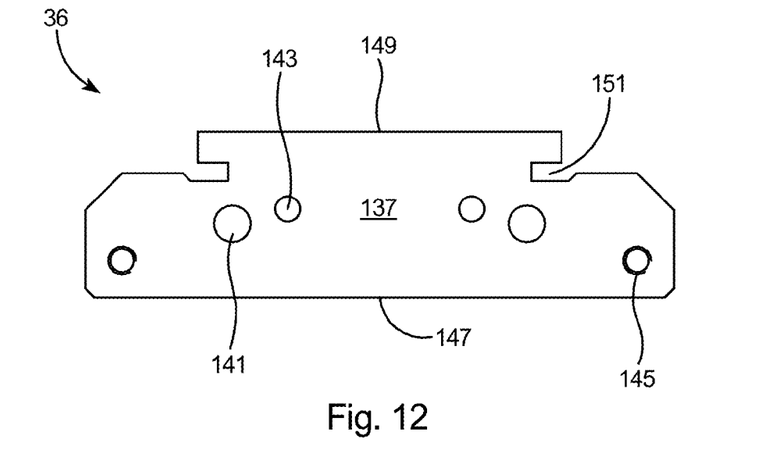
FIG. 12 is a plan view of the bracket.
Figure 13:
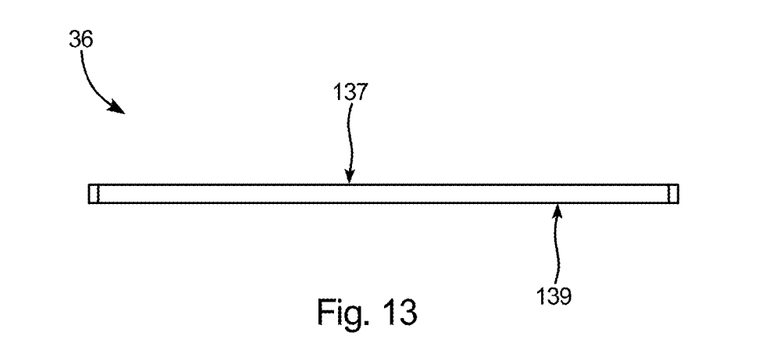
FIG. 13 is a side view of the bracket.

With reference to FIGS. 11-13 bracket 36 is a substantially planar plate that includes an inner side 137, an outer side 139, alignment apertures 141, box engagement apertures 143, and fan or fixture apertures 145 therein extending from the inner side to the outer side. The bracket 36 includes a long side 147 and a short side 149 and two opposing slots 151 near the short side 149.

Figure 14:
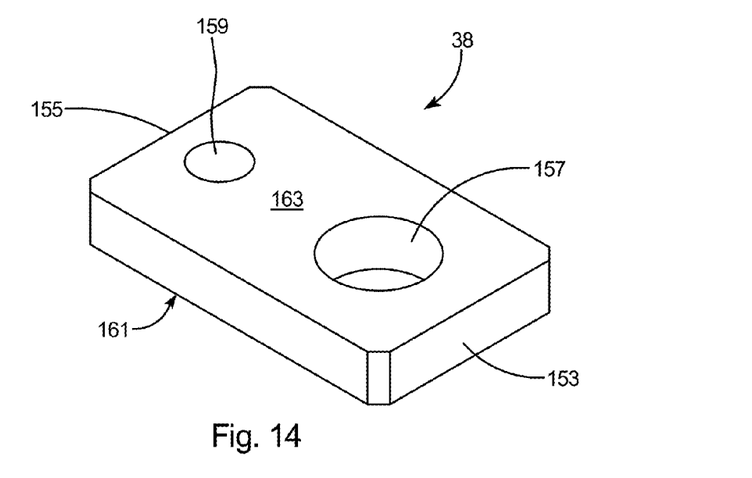
FIG. 14 is an isometric view of a screw retaining tab that forms a portion of the adjustable fan box of FIG. 1.
Figure 15:
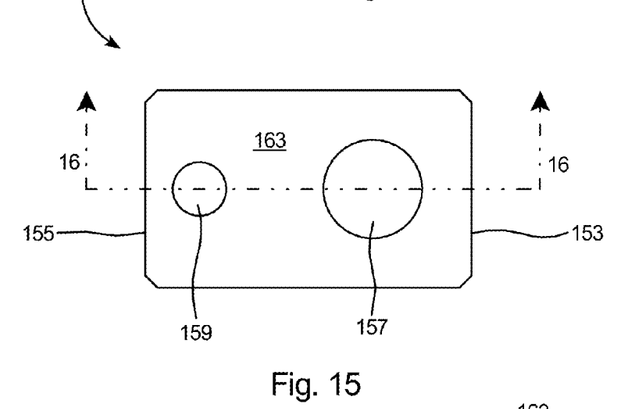
FIG. 15 is a plan view of the screw retaining tab.
Figure 16:
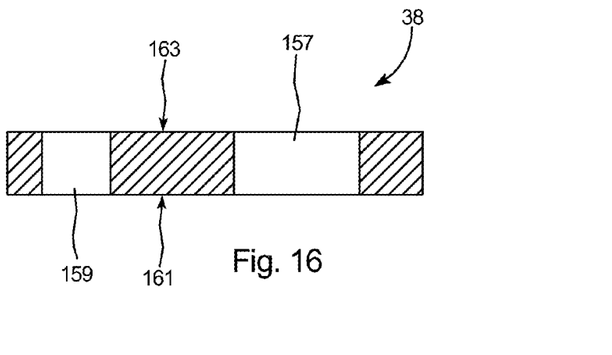
FIG. 16 is a sectional view of the screw retaining tab taken along line 16-16 of FIG. 15.

Referring to FIGS. 14-16, screw retaining tab 38 includes an inner end 153, an outer end 155, an alignment aperture 157, and a screw retaining aperture 159 therein. Screw retaining tab 38 further includes a first surface 161 and a second surface 163.

Figure 17:
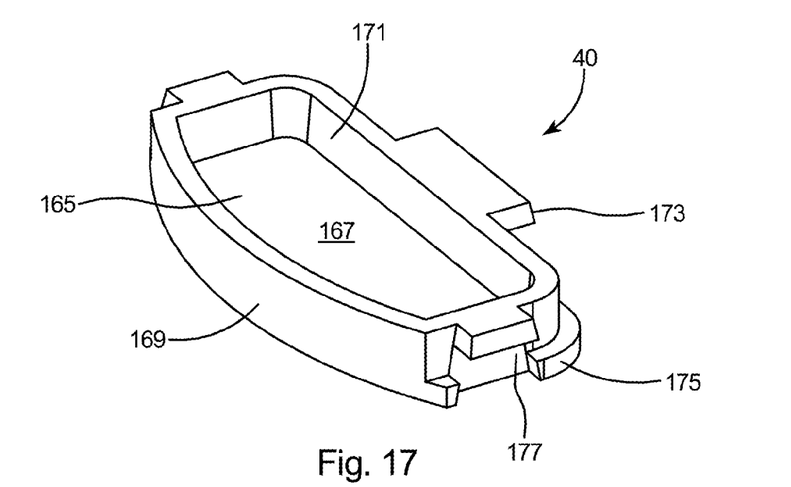
FIG. 17 is an isometric view of a box rim plate that forms a portion of the adjustable fan box of FIG. 1.

With reference to FIG. 17, box rim plate 40 includes a flat body 165 having a top surface 167 and a perimeter wall 169. Perimeter wall 169 and top surface 165 create a recessed area 171 on the top side of the box rim plate. The box rim plate 40 further includes one or more top tabs 173 extending from the top of the perimeter wall 169 and one or more bottom tabs 175 extending from the bottom of the perimeter wall 169. The top tabs 173 and bottom tabs 175 define a channel 177 there between that function to snap engage the narrowed portions 113 around the perimeter 105 of the notch 58 of the electrical box 32 (see FIG. 6).

Figure 18:
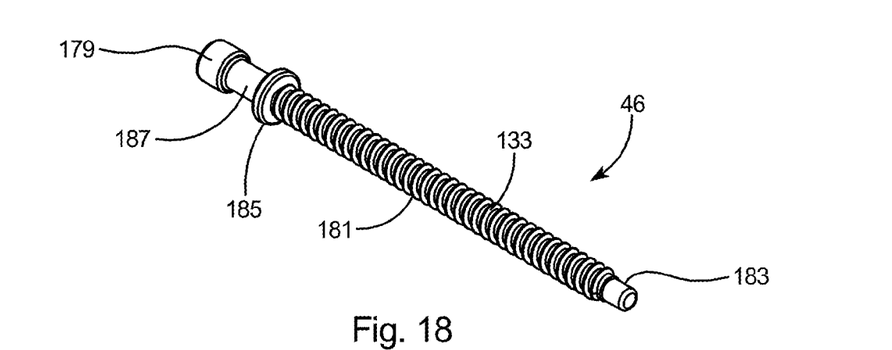
FIG. 18 is an isometric view of a depth-adjustment screw that forms a portion of the adjustable fan box of FIG. 1.
Figure 19:
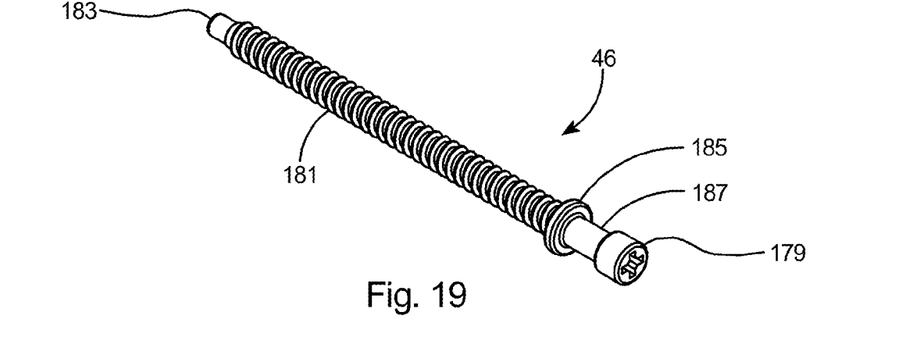
FIG. 19 is an isometric view of the depth-adjustment screw from the opposing end as that shown in FIG. 8.

Referring to FIG. 18, an adjusting screw 46 according to the present invention includes a head 179, a threaded shank 181 including threads thereon, a threadless tip 183, a collar 185 near the head, the collar 185 extending outward of the threads, and a seat 187 between the head 179 and the collar 185, the seat being smooth and of smaller diameter than the threaded shank 181.

With reference to FIG. 1, the depth-adjustable electrical box assembly 30 is assembled by first sliding slide plate 34 within the channels 101 at the sides of the flat wall 50 of electrical box 32. Adjusting screw 46 is then passed through boss 74 of electrical box 32 and rotated through the parallel outturned ribs 131 of slide plate 34. Screw retaining tab 38 is then aligned with electrical box 32 by aligning alignment aperture 157 of screw retaining tab 38 with post 88 of electrical box 32 and slipping the screw retaining tab 38 into recess 60 of electrical box. Bracket 36 is then aligned with top surface 52 of electrical box 32 by fitting alignment posts 80 of electrical box through alignment apertures 141 of bracket 36. Bracket 36 is secured to top surface 52 of electrical box 32 by tightening bracket mounting screws 44 through apertures 143 of bracket into apertures 82 of electrical box. Once secured to the electrical box 32, the bracket 36 holds screw retaining tab 38 within the electrical box assembly and slide plate 34 against flat wall 50 and within channels 101 of electrical box. Threadless tip 183 of adjusting screw 46 engages screw retaining aperture 159 of screw retaining tab 38. The aperture 159, which could be a bore partially through the screw retaining tab 38, keeps the adjusting screw 46 in proper axial alignment with the sliding plate 34 and electrical box 32, and keeps the adjusting screw 46 from being bent out of axial alignment. The depth-adjustable electrical box assembly 30 may then be secured to an overhead support by driving nails, screws, or similar fasteners 186 (through apertures 129 in nailing flange 127 and through apertures 117 in ears of slide plate 34. Arcuate bottom rim 54 of electrical box 32 can then be adjusted parallel to the desired level with respect to surface of the ceiling (not shown) by turning adjusting screw 46 in the appropriate direction to raise or lower the electrical box with respect to the ceiling. After the electrical box 32 is at the desired level with respect to the ceiling, box rim plate 40 may be snapped into the notch 58 of the electrical box to provide a circular bottom rim 188 on the electrical box and to occlude sight of the slide plate 34 from the bottom of the assembly. If further adjustment of the level of the electrical box 32 with respect to the ceiling is required at a later date, the adjusting screw 46 is accessible from the bottom of the adjustable fan box assembly 30.

Figure 20:
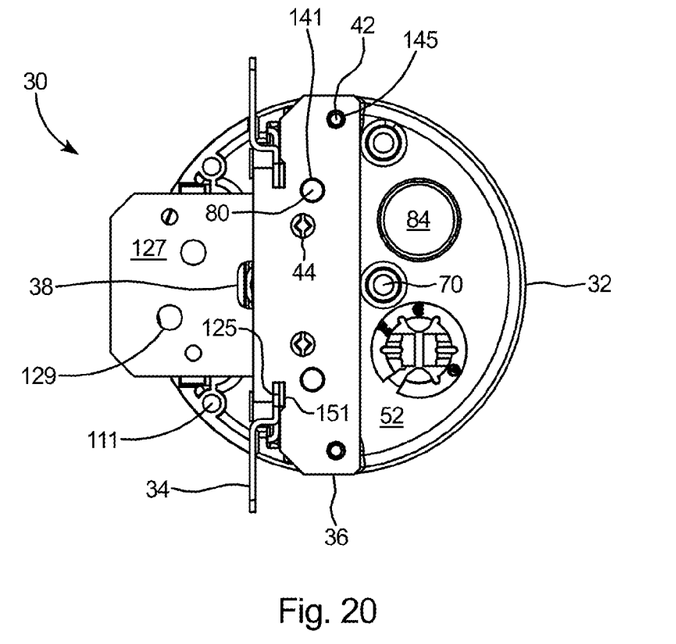
FIG. 20 is a top view of the adjustable fan box of FIG. 1.
Figure 21:
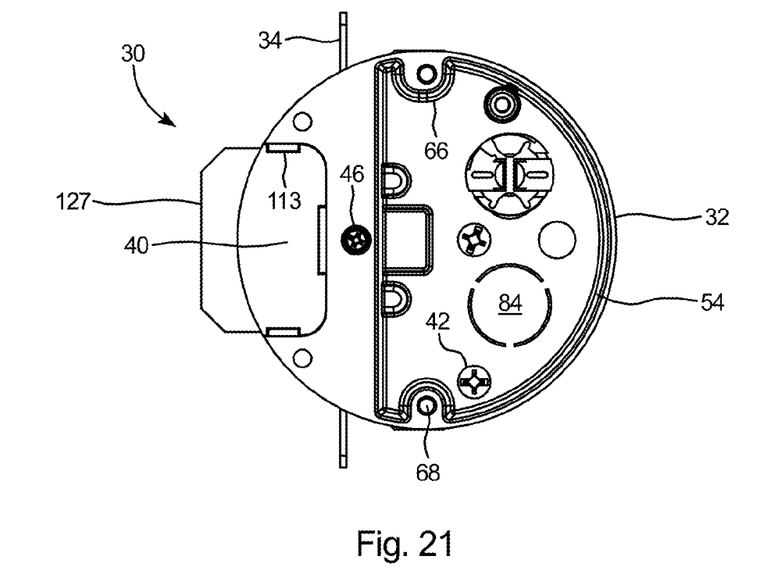
FIG. 21 is a bottom view of the adjustable fan box.

With reference to FIG. 20, the adjustable fan box assembly 30 includes bracket mounting screws 44 securing bracket 36 and screw retaining tab 38 to the electrical box 32. As shown in FIG. 21, the adjusting screw 46 is accessible from the bottom of the adjustable fan box assembly 30.

Figure 22:
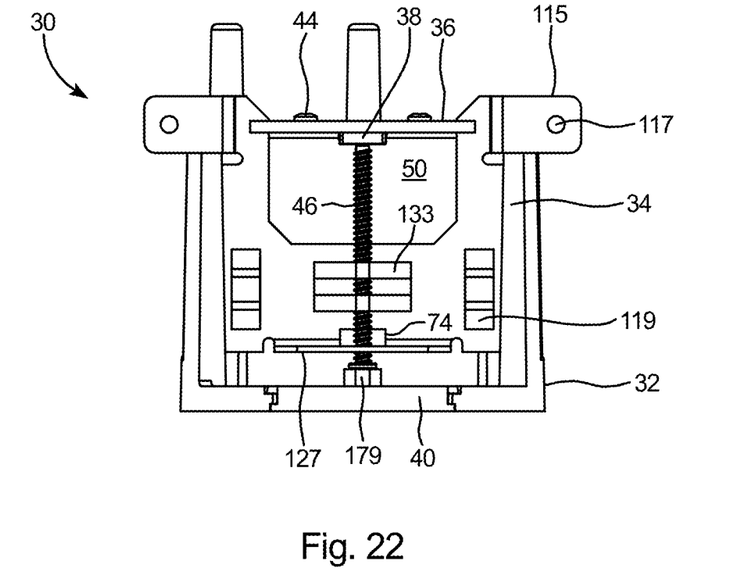
FIG. 22 is a side view of the adjustable fan box from the side depicting the slide plate.

Referring to FIG. 22, clockwise rotation of adjusting screw 46 will raise the level of the electrical box 32 with respect to the ceiling and counterclockwise rotation of adjusting screw 46 will lower the level of the electrical box 32 with respect to the ceiling.

Figure 23:
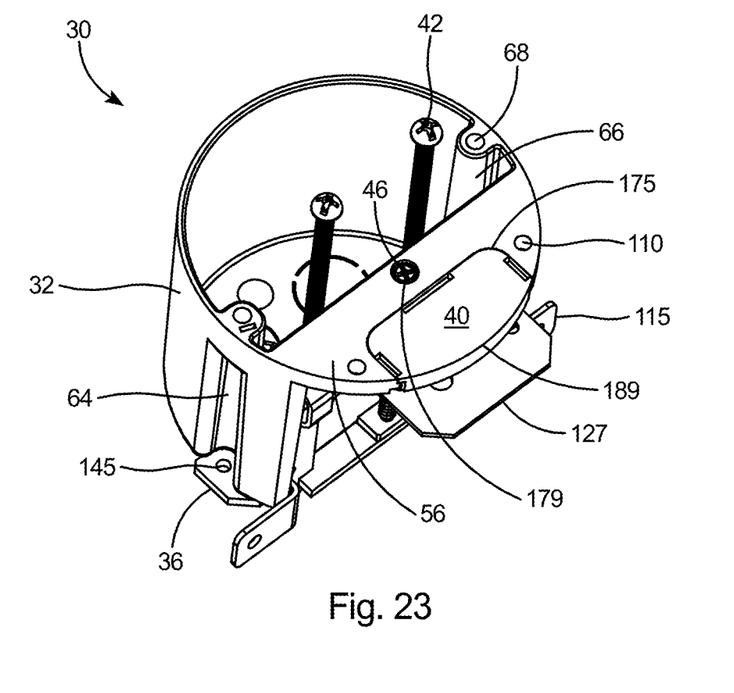
FIG. 23 is a bottom isometric view of the adjustable fan box.

The electrical box assembly 30 is provided as an assembly as shown in FIG. 23. The device mounting screws 42 are captively held within the electrical box assembly 30 within the bores 70 of mounting screw receptacles 62 (see FIG. 5). The mounting screw receptacles 62 hold the mounting screws 42 during storage and shipment. At the jobsite, after the electrical box assembly 30 is secured to an overhead support, the installer removes the mounting screws 42 from the screw receptacles 62 and uses them to mount a fan or fixture (not shown) to the support through bores 68 of box mounting bosses 66. Preferably the bottom surface of the box rim plate 40 is flush with the sidewall extension 56 and the rim 54. The head 179 of the adjusting screw 46 is recessed below the level of the sidewall extension 56 and the box rim plate 40.

In the embodiment shown herein, the depth-adjustable electrical box assembly 30 is capable of supporting a fan of up to 70 pounds and a fixture of up to 100 pounds. Bracket 36 and screw retaining tab 38 are each preferably constructed of galvanized steel and each include a thickness of at least 0.125 inch. Sliding plate 34 preferably is constructed of galvanized steel and includes a thickness of at least 0.062 inch.

Figure 24:
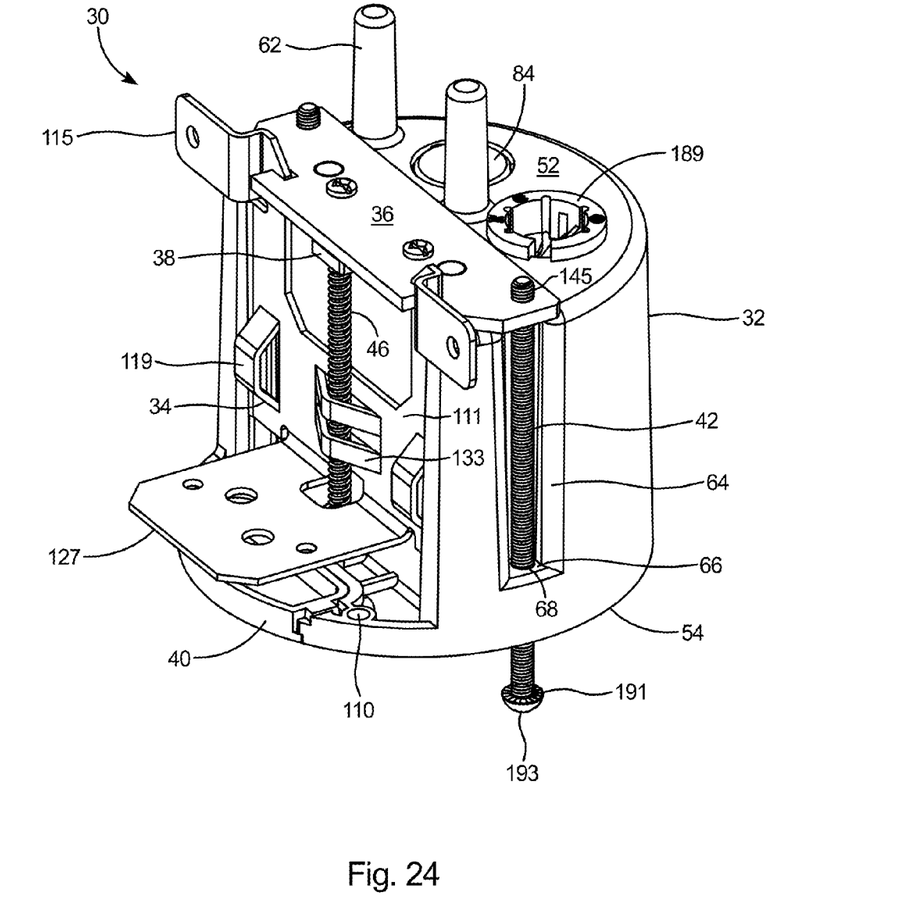
FIG. 24 is a top isometric view of the adjustable fan box.

With reference to FIG. 24, one or more of the knockout panels 84 may be removed from the top wall 52 of the electrical box 32 and an electrical fitting 189 may be fitted within the resultant knockout 86 (see FIG. 6) in the top wall of the electrical box 32. One such electrical fitting 189 may be the Black Button® push-in fitting or connector for connecting non-metallic cable to electrical boxes. The Black Button® push-in fitting is available from Arlington Industries of Scranton, Pa. Use of the push-in fitting will enable push-in connection of a non-metallic cable (not shown) to the electrical box 32.

Electrical box 32 may be formed of metal or plastic. Most preferably electrical box 32 is molded in one piece of plastic. Suitable plastics include such as polycarbonate or polyvinyl chloride. Serrations 191 are preferably included under the head 193 of the device mounting screws 42 to lessen the chance of unintended loosening of the screws while they are supporting a rotating fan or a stationary fixture. As shown in FIG. 24, mounting screws 42 preferably are long enough to extend from the arcuate bottom rim 54 through channel 64 and completely through apertures 145 in thick bracket 36.

Figure 25:
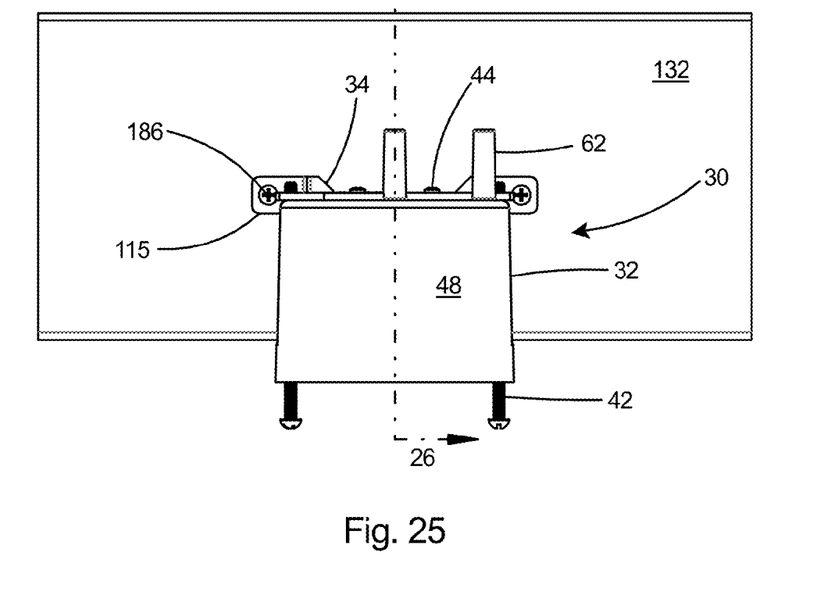
FIG. 25 is a front elevation view of the adjustable fan box secured to a joist.
Figure 26:
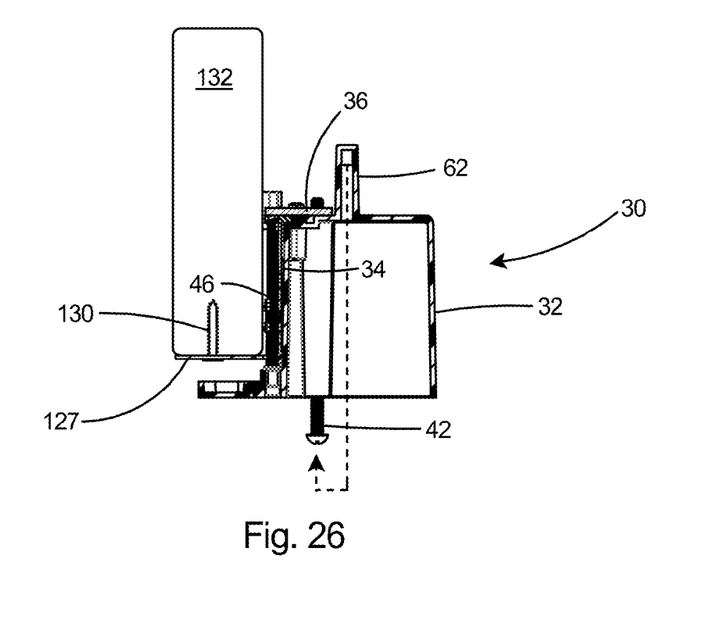
FIG. 26 is a side view of the adjustable fan box secured to a joist.
Figure 27:
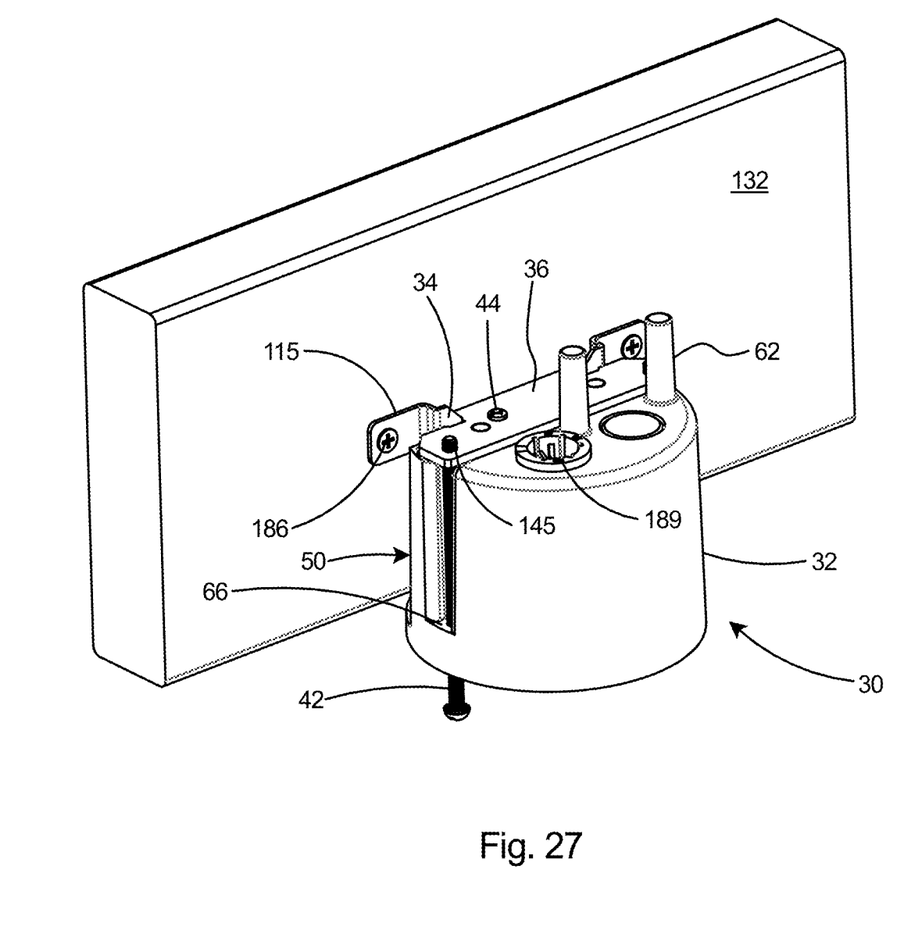
FIG. 27 is an isometric view of the adjustable fan box secured to a joist.

With reference to FIGS. 25-27, the depth-adjustable electrical box assembly 30 is shown secured to a joist 132. The assembly is secured to the joist 132 by fasteners 186 driven through wings 115 of slide plate 34 and fasteners 130 driven through nailing flange 127 of slide plate. For mounting an electrical device (not shown), such as a fan or light fixture, to the electrical box assembly 30, mounting screws 42 are removed from captive storage in mounting screw receptacles 62 (see FIG. 26) and inserted through box mounting boss 66 of electrical box 32 and into apertures 145 in bracket 36 to secure the device to the assembly. The adjusting screw 46 is accessible from the bottom of the assembly 30 after being secured to the joist 132. The assembly 30 is thus a post-installation depth-adjustable electrical box assembly for mounting of a fan or fixture on a ceiling. The meaning of post-installation as used herein is that the depth of the electrical box assembly can be adjusted at any time after being secured to the joist, as the head of the adjusting screw is accessible from the bottom of the assembly.

Having thus described the invention with reference to a preferred embodiment, it is to be understood that the invention is not so limited by the description herein but is defined as follows by the appended claims. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention.

What is claimed is:

1. A depth-adjustable electrical box assembly, comprising:
    an electrical box including an arcuate side wall, a flat side wall, and a top wall defining an electrical enclosure;
    opposing channels on said flat side wall;
    a slide plate including a base plate having edges disposed in said opposing channels, said slide plate slideable with respect to said electrical box;
    a bracket secured to said top wall of said electrical box;
    a screw retaining tab secured between said bracket and said top wall of said electrical box;
    wings on said slide plate;
    opposing slots on said bracket, said wings of said slide plate extending through said opposing slots of said bracket;
    a sidewall extension extending from said flat side wall of said electrical box;
    a notch in said sidewall extension;
    a box rim plate for insertion at said notch of said sidewall extension;
    a perimeter wall on said box rim plate, said perimeter wall including a top and bottom;
    one or more tabs extending from the top and the bottom of the perimeter wall of the box rim plate; and
    said tabs defining a channel for accepting snap engagement of said box rim plate into said notch of said sidewall extension of said electrical box.

2. The depth-adjustable electrical box assembly of claim 1, further comprising:
    a nailing flange on said slide plate; and
    an adjusting screw for adjusting the position of said electrical box with respect to said slide plate.

3. The depth-adjustable electrical box assembly of claim 2 further comprising:
    a boss in said sidewall extension of said electrical box; and
    said adjusting screw extending through said boss, said adjusting screw including a head and a distal end.

4. The depth-adjustable electrical box assembly of claim 1, further comprising:
two open channels on said arcuate side wall of said electrical box; and
device mounting screws extend through said open channels of said electrical box.

5. A depth-adjustable electrical box assembly, comprising:
an electrical box including an arcuate side wall with a bottom rim, a flat side wall, and a top wall defining an electrical enclosure;
a sidewall extension including a box rim plate on said electrical box;
opposing channels on said flat side wall;
a slide plate including a base plate having edges disposed in said opposing channels, said slide plate slideable with respect to said electrical box;
a bracket secured to said top wall of said electrical box;
an adjusting screw including threads and a head for adjusting the depth of the electrical box with respect to the slide plate; and
said head of said adjusting screw recessed below the level of said bottom rim of said arcuate sidewall, said sidewall extension, and said box rim plate.

6. The depth-adjustable electrical box assembly of claim 5, further comprising two parallel outturned ribs extending from said base plate, said parallel outturned ribs including thread engagement surfaces for capturing and engaging threads of said adjusting screw.

7. The depth-adjustable electrical box assembly of claim 6, further comprising:
a base plate and a nailing flange on said slide plate; and
said nailing flange extends at a 90° angle from said base plate.

8. The depth-adjustable electrical box assembly of claim 6, further comprising:
a recessed area on said top wall at the intersection of said top wall with said flat side wall; and
a post extending from said recessed area in said top wall.

9. The depth-adjustable electrical box assembly of claim 6, further comprising:
a screw retaining tab secured between said bracket and said top wall of said electrical box; and
said screw retaining tab including an alignment aperture therein for aligning said screw retaining tab with said electrical box and said adjusting screw.

10. A depth-adjustable electrical box assembly, comprising:
an electrical box including an arcuate side wall, a flat side wall, a bottom rim, and a top wall defining an electrical enclosure;
a slide plate including a base plate having edges disposed in said opposing channels, said slide plate slideable with respect to said electrical box;
a bracket secured to said top wall of said electrical box;
an adjusting screw including threads and a distal end for adjusting the depth of the electrical box with respect to the slide plate;
a screw retaining tab secured between said bracket and said top wall of said electrical box;
means for aligning said adjusting screw with respect to said electrical box and said slide plate;
means for securing an electrical device to said bottom rim; and
means for closing said notch to form a circular bottom rim.

11. The depth-adjustable electrical box assembly of claim 10, wherein said means for aligning said adjusting screw further comprises:
a boss extending from said flat side wall of said electrical box; and
a screw retaining aperture in said screw retaining tab for retaining said distal end of said adjusting screw.

12. The depth-adjustable electrical box assembly of claim 10, further comprising:
wings on said base plate;
said base plate residing in a plane;
said wings residing in a second plane; and
said plane containing said wings is laterally offset from the plane containing the base plate.

13. The depth-adjustable electrical box assembly of claim 10, further comprising:
a rib extending from the base plate; and
said rib including an outer surface that is offset from the base plate.

* * * * *